Figure 1:
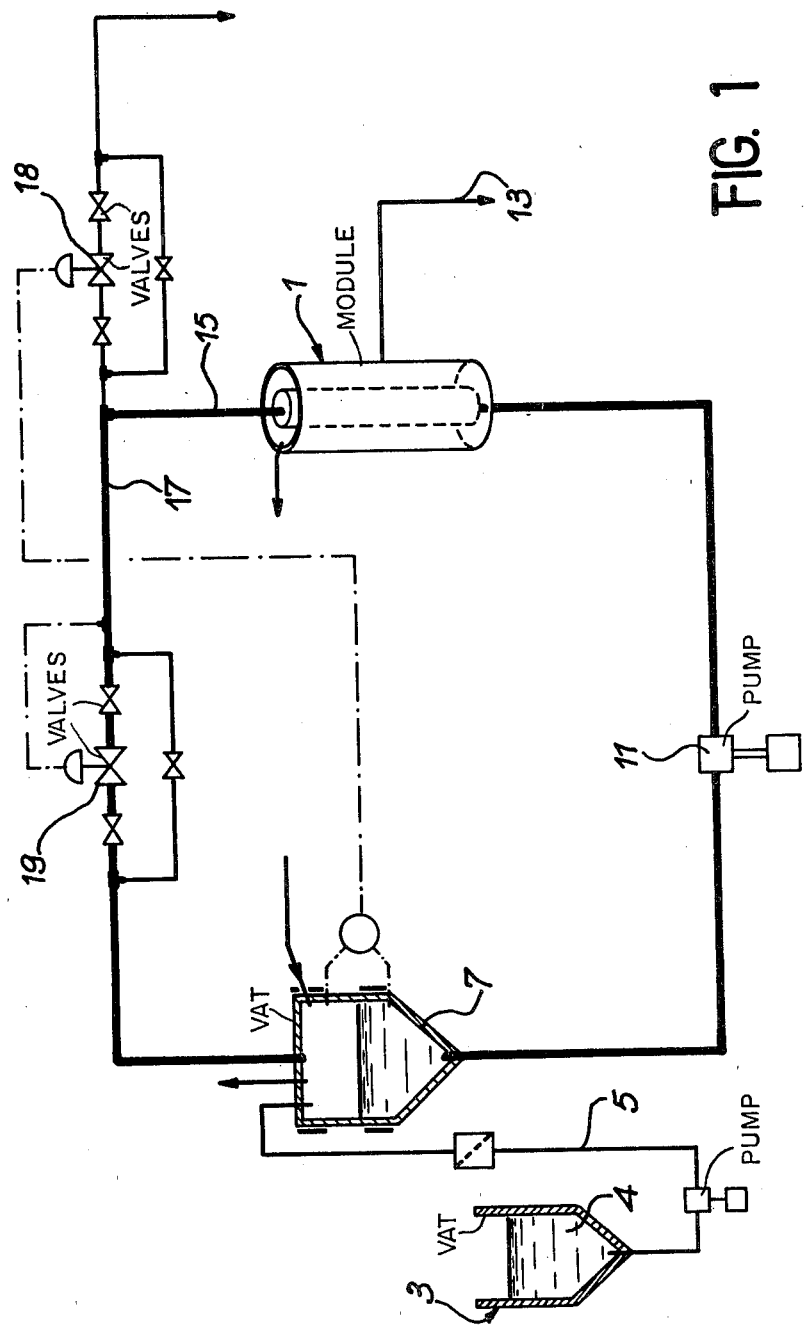

United States Patent [19]
Arod et al.

[11] 4,411,790
[45] Oct. 25, 1983

[54] PROCESS FOR THE TREATMENT OF A HYDROCARBON CHARGE BY HIGH TEMPERATURE ULTRAFILTRATION

[75] Inventors: Jean Arod, Pierrevert; Bernard Bartoli, Jouques; Pierre Bergez, Paris; Jean Biedermann, Montivilliers; Philippe Caminade, Pierrelatte; Jean-Marie Martinet, Montelimar; Jean Maurin, Montivilliers; Jean Rossarie, Le Havre, all of France

[73] Assignees: Commissariat a l'Energie Atomique; Compagnie Francaise de Raffinage, both of Paris, France

[21] Appl. No.: 265,660

[22] Filed: May 20, 1981

[30] Foreign Application Priority Data

May 22, 1980 [FR] France ................................ 80 11442

[51] Int. Cl.³ ............................................ B01D 13/00
[52] U.S. Cl. .................................... 210/637; 210/651; 210/799; 210/805; 210/806; 208/186; 208/187; 208/309; 585/818
[58] Field of Search ............... 210/636, 637, 650, 651, 210/708, 774, 779, 781, 805, 806, DIG. 5, 791, 799; 585/818, 819; 208/179, 184, 186, 187, 309; 252/322, 347, 349

[56] References Cited

U.S. PATENT DOCUMENTS

| | | | |
|---|---|---|---|
| 3,853,756 | 12/1974 | Stana | 210/636 |
| 3,947,327 | 3/1976 | Greenfield et al. | 208/187 X |
| 3,977,967 | 8/1976 | Trulson et al. | 210/651 X |
| 3,990,963 | 11/1976 | Audibert et al. | 208/179 |
| 4,060,488 | 11/1977 | Hoover et al. | 210/433.2 |
| 4,239,616 | 12/1980 | Gearhart | 208/309 |

FOREIGN PATENT DOCUMENTS

| | | | |
|---|---|---|---|
| 1197982 | 12/1959 | France | 210/500.2 |
| 2251351 | 6/1975 | France | 210/500.2 |

*Primary Examiner*—David R. Sadowski
*Attorney, Agent, or Firm*—Dennis P. Clarke

[57] ABSTRACT

The present invention relates to a process for the treatment of a hydrocarbon charge by high temperature ultrafiltration, said process comprising the steps of circulating said charge in a module comprising at least one mineral ultrafiltration barrier coated with a sensitive mineral layer of at least one metal oxide and of operating at a temperature higher than 100° C. The barrier, which preferably has a ceramic or metallic support, is coated with a sensitive layer selected from the group comprising titanium dioxide, magnesium oxide, aluminium oxide, spinel $MgAl_2O_4$, silica. The invention is applicable to the regeneration of a waste oil and to the reduction of the rate of asphaltenes in a hydrocarbon charge.

14 Claims, 4 Drawing Figures

PROCESS FOR THE TREATMENT OF A HYDROCARBON CHARGE BY HIGH TEMPERATURE ULTRAFILTRATION

The present invention relates to a process for treatment of a hydrocarbon charge by high temperature ultrafiltration.

"Hydrocarbon charge" is understood to mean a charge composed mainly of hydrocarbons, but it may also contain other compounds which, apart from the carbon and hydrogen atoms, may contain heteroatoms such as oxygen, nitrogen, sulfur or vanadium.

Such charges may be constituted in particular by products obtained when refining crude oil.

Ultrafiltration is a technique of separation by mass transfer through a semi-permeable membrane under the effect of a pressure gradient, the product collected passing through the membrane constituting the ultrafiltrate.

Consumption of motor oil in France amounts to approximately 550,000 tons per year, from which 250,000 tons per year of waste oil are recovered. Only a small part of these 250,000 tons of waste oil is regenerated by a process including an acid treatment for flocculating the carbon particles that it contains. This process has the drawback of producing acid sludge which must be eliminated.

Most of the crude oil supplying French refineries is asphaltic and, after distillation under reduced presure, yields a residue formed by malthenes, resins and asphaltenes. This residue may represent up to 20% of certain crude oils. Deasphalting, which consists in reducing the asphaltene content of this residue is usually effected with the aid of a paraffinic solvent which flocculates the asphaltenes as well as a variable proportion of resins. The asphaltenes constitute pitch whilst the malthenes constitute an oil. This process necessitates a considerable consumption of energy to recover the solvent. It may be estimated that the residues of distillation to be deasphalted would be of the order of ten million to fifteen million tons per year if an economical process were available to this end.

However, the valorisation or regeneration, by ultrafiltration, of the oil products or residues has found only few concrete applications as these products are very viscous and difficult to handle at ambient temperature.

Processes for the treatment of oil products by ultrafiltration using organic membranes are known. According to one example of such a process described in French Pat. No. 2 263 296 for a "Process for regeneration of used lubricating oil," the oil, after elimination of various components by distillation, is mixed with a solvent such as n-hexane. The mixture obtained is then subjected to ultrafiltration through an organic barrier.

As disclosed in this Patent, the processes for treatment by ultrafiltration with the aid of organic membranes impose a dilution with the aid of a solvent, to have low viscosity, as the organic membranes cannot be used at high temperature. Thus, in the example cited, the ultrafiltration temperature is only 23° C. It is necessary to distill the ultrafiltrate then in order to separate the solvent and the valorisable compound, which is a drawback.

It is an object of the present invention to propose an economical process for treating hydrocarbon charges.

The invention relates to such a process for treatment of a hydrocarbon charge by high temperature ultrafiltration using a mineral barrier. This process is applied to the regeneration of a used motor oil. It is also applied to the reduction in the asphaltene content in a hydrocarbon charge constituted for example by a residue of distillation under reduced pressure of the oil.

More precisely, this process is characterised in that the charge is filtered by means of at least one mineral barrier formed by a support coated with a sensitive mineral layer of at least one metal oxide and in that operation is carried out at a high temperature greater than 100° C. and preferably between 100 and 350° C.

The pressure of ultrafiltration may in particular be between 1 and 20 relative bars.

The speed of circulation of the charge may be between 1 and 10 m/s.

The mineral barrier is a barrier with metal or ceramic support, said support being coated with a sensitive layer of at least one metal oxide chosen from the group including titanium dioxide, magnesium oxide, aluminium oxide, mixed oxides based on alumina, silica. Such barriers are marketed by the firm SFEC (Société Française de Fabrications Catalytiques) under references UFS 100 Å, UFS 150 Å, UFS 200 Å, depending on their radius of permeametry. Barriers of a different radius of permeametry may, of course, be used in the process of the invention and the radius may for example be between 50 Å and 250 Å.

According to the applications envisaged of the process according to the invention, the barriers may be grouped in variable number in ultrafiltration modules. These modules may be disposed in series, in parallel or in series-parallel. The different modules may contain barriers having different radii of permeametry, for example the first, barriers of radii of 200 Å, the following of 150 Å and so on.

According to a first application, the process according to the invention is used for the regeneration of used motor oils. Such oils, coming for example from an oil change of a vehicle, contain from 15 to 20% of impurities. Such impurities are for example water, sludge, carbonaceous particles on which the dispersive agents are adsorbed, products of oxidation of oil or petrol, resins and lacquers in solution in the hot oil, in suspension in the cold oil, metallic particles and finally machining liquids.

The ultrafiltrate produced by the process of the invention is of good quality. It contains virtually no more metals nor additives. By way of example, the rates of ultrafiltration reach 500 l/day.m$^2$ with 200 Å barriers for an operating temperature of 200° C., a pressure of 5 bars and a concentration factor of 3.

The process of ultrafiltration according to the invention also finds an application to the reduction in the rate of asphaltenes contained in a hydrocarbon charge.

It is known that the residues of distillation under reduced pressure of crude oils, i.e. the heaviest part, is precisely that part which contains the most viscous lubricating fractions which are of greatest value. Now, the majority of crude oils supplying French refineries are asphaltic and yield, after distillation under reduced pressure, a residue formed of malthenes, resins and asphaltenes representing up to 20% of certain crude oils. As lubricating oils must not contain asphaltenes, even in traces, they must be deasphalted. The process of ultrafiltration according to the invention finds an application to the reduction in the rate of asphaltenes contained in a hydrocarbon charge. The hydrocarbon charge containing asphaltenes is treated by ultrafiltration according to the process of the invention. The asphaltenes are retained by the barriers and, in the ultrafiltrate, their rate is reduced.

The invention will be more readily understood on reading the following description with reference to the accompanying drawings, in which:

FIG. 1 schematically shows an embodiment of the process of ultrafiltration of the invention.

Figure 2:
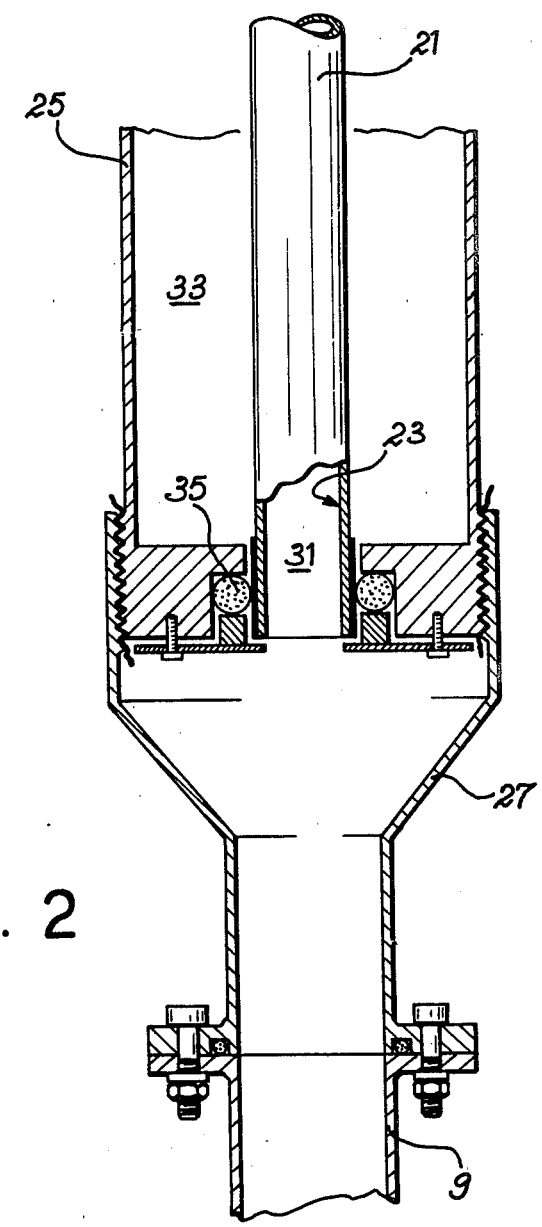

FIG. 2 schematically shows the filtration barriers used in the process of the invention.

Figure 3:
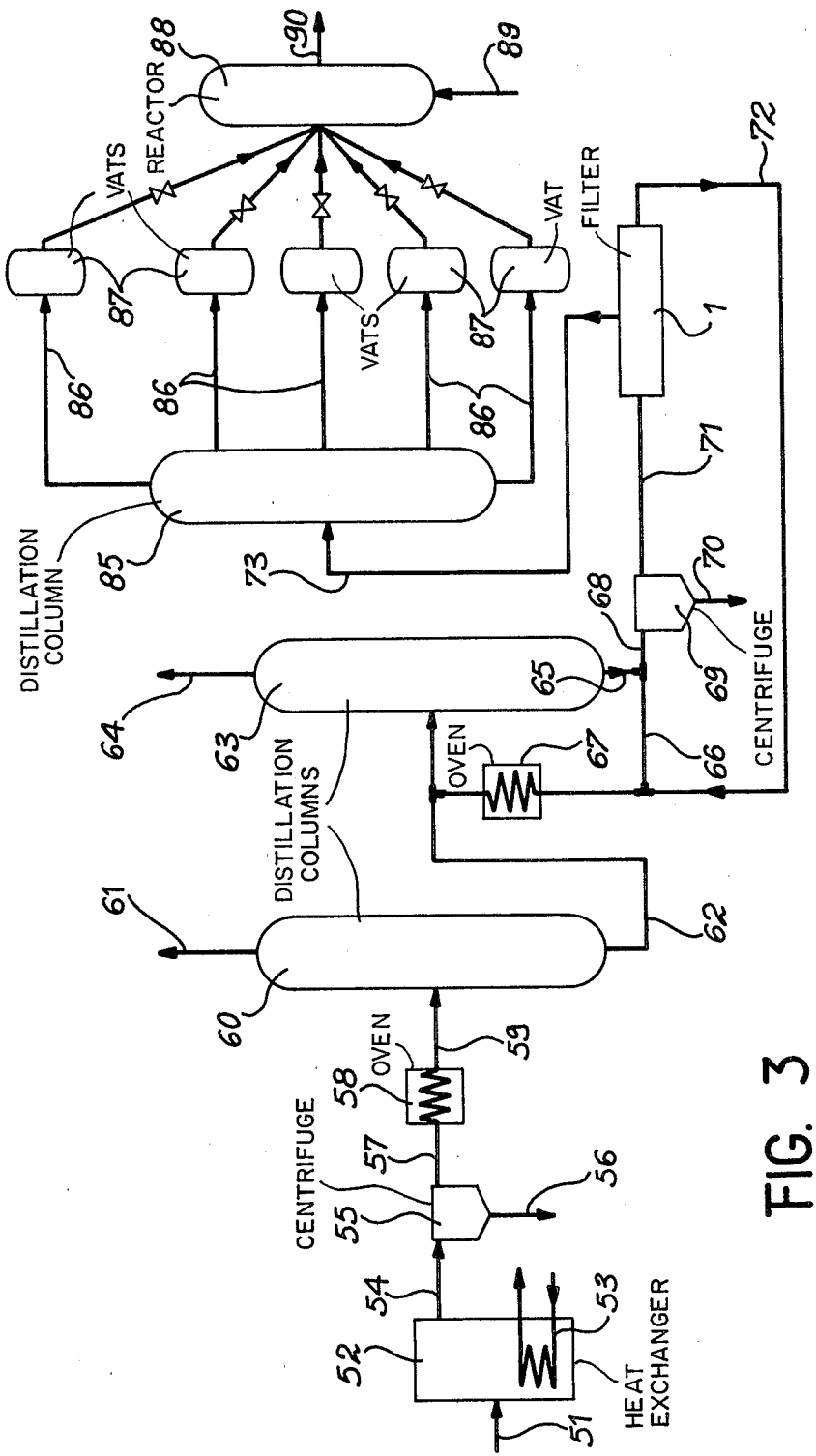
Figure 4:
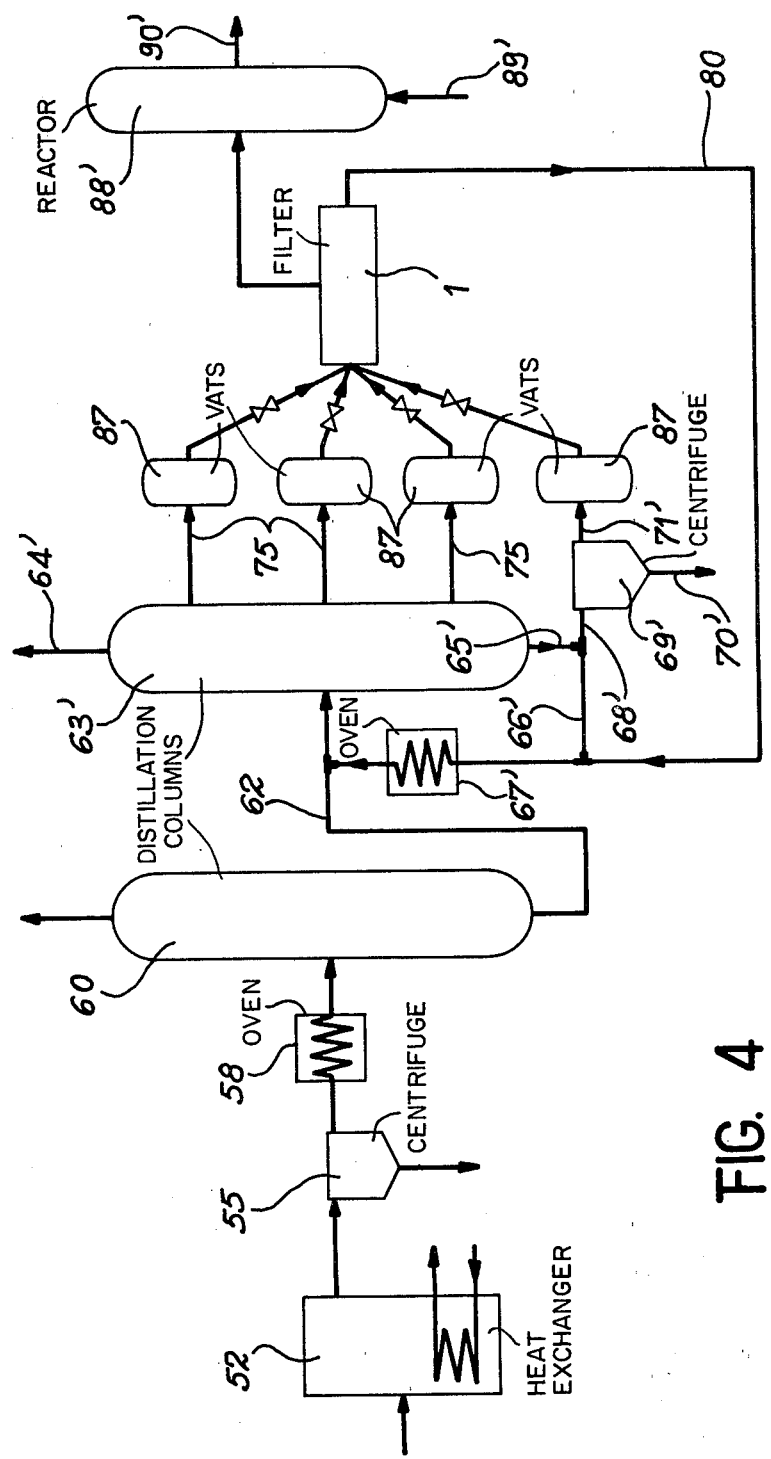

FIGS. 3 and 4 show embodiments of the process according to the invention applied to the regeneration of a waste oil.

Referring now to the drawings, FIG. 1 schematically shows an embodiment of the process according to the invention. The ultrafiltration module 1 comprises a plurality of mineral barriers for ultrafiltration, but only one barrier has been shown to simplify the drawing. Each carrier is formed by a cylindrical ceramic support with an internal diameter of 15 mm and a length of 800 mm internally coated with an ultrafiltration layer based on metal oxides. The normal direction of flow of ultrafiltrate is therefore from the inside of the barrier to the outside. The active surface of each barrier is 360 cm$^2$.

The installation comprises a vat 3 into which is introduced the charge 4 of hydrocarbon to be treated. The vat 3 is connected via a pipe 5 to a buffer vat 7. From the buffer vat 7, the charge of ultrafiltrate is introduced under pressure by means of a gear pump 11 inside the ultrafiltration module 1. The charge 4 circulates in the module 1. Part of this charge flows through ultrafiltration barriers: this is the ultrafiltrate. It is collected at 13. The other part leaves at 15 from the ultrafiltration module 1 to be recycled via a piper 17 towards the buffer vat 7.

The ultrafiltration barriers are characterised by their radius of permeametry. These barriers are available on the market for radii of permeametry of 100, 150 and 200 Å.

Impurities are present, either in suspension or in solution in the charge 4 of hydrocarbon. These impurities may be constituted for example by sludge, carbonaceous particles, products of oxidation of oil or petrol, metal particles, additives in a more or less degraded state. In the course of ultrafiltration, these impurities are for the most part retained by the ultrafiltration barriers. Consequently, their concentration increases. The circuit comprises a valve 18 for drawing off the concentrate which enables the level in the buffer vat 7 to be regulated.

The circuit further comprises a valve 19 for regulating pressure.

The whole circuit is heat-insulated and laid out electrically. It further comprises apparatus for measuring rate of flow and pressure.

The process for treatment of a hydrocarbon charge, by ultrafiltration, according to the invention, finds application in the regeneration of a waste oil. The hydrocarbon charge 4 is then constituted by the waste oil itself. The different impurities present in this waste oil are retained by the ultrafiltration barriers. The ultrafiltrate collected at 13 is constituted by an oil from which its impurities have been removed and of which the characteristics are consequently similar to those of a base oil.

According to the invention, the quality of separation is improved by subjecting the waste oils to a heat treatment, which consists in a prior heating of the oil to a temperature of between 200° and 350° C.

In order to prevent the barriers from progressively clogging, a counter-pressure of ultrafiltrate may periodically be applied on their outer face, and the pressure on the inner face is reduced, this provoking a reversal of the direction of ultrafiltration. The pressure applied on the outer face may be between 1 and 30 relative bars. This operation, which is of short duration and effected at fixed intervals of time, is carried out without interrupting the circulation of the hydrocarbon charge inside the barriers and without modifying the temperature.

FIG. 2 shows a diagram of an ultrafiltration barrier used for the regeneration of a waste oil. This barrier is in the form of a tube 21 of 80 cm length, 1.5 cm inner diameter, 1.9 cm outer diameter. The thickness of the tube 21 is essentially formed by a support material whose pore radius is of the order of 1$\mu$. The inside of the tube 21 is coated with a sensitive layer 23 whose pores are calibrated as a function of the elements to be separated. The ultrafiltration module comprises 7 barriers placed in a tube 25 of 7.5 cm diameter.

A connecting cone 27 connects the tube 25 to the pipe 9. The waste oil penetrates in the ultrafiltration module via the pipe 9, then circulates inside the high pressure chamber 31. It then flows through the barrier 21 towards the low pressure chamber 33.

With a view to allowing tightness between the high pressure chamber 31 and low pressure chamber 33 at the position of the barrier supports, the tubes are vitrified at their end over a length of 2 centimeters. The high pressure and low pressure chambers are isolated by seals 35. These seals 35 are O-rings made of Viton if the temperature is lower than 180° C. and flat seals treated with graphite if the temperature is greater than 180° C.

FIGS. 3 and 4 show embodiments of the process according to the invention applied to the regeneration of a waste oil. The charge of waste oil is introduced via line 51 into a chamber 52 where, due to a coil 53 in which a heat transfer fluid circulates, the oil is heated before being subjected to centrifugation in a centrifuge 55 to which it is conducted via line 54 on leaving the chamber 52.

The temperature to which the oil is heated in chamber 52 and therefore that at which centrifugation is effected, may for example be between 60° and 95° C. and in particular close to 90° C.

Centrifugation makes it possible to separate the greater part of the water and the solid matters contained in the oil, which are evacuated via line 56. The oil leaving the centrifuge via line 57 passes into an oven 58 where it is heated before being subjected to a distillation under a pressure close to atmospheric pressure in a distillation column 60, in the median part of which it is conducted via line 59.

The temperature to which the oil is heated in the oven 58, and therefore that at which distillation is effected, may for example be between 150° and 200° C. and in particular close to 180° C.

A gaseous effluent constituted by light products, such as water not separated in the centrifuge 55, petrol and the chlorinated solvents contained in the oil, is collected at the top of the column 60 via line 61.

The oil is collected at the bottom of the column 60, via line 62. It is conducted in the median part of a distillation column 63 where the temperature is close to 360° C.

The pressure inside the column 63 is equal to or close to atmospheric pressure.

A fraction constituted by gas oil is collected at the top of column 63 via line 64.

The oil is collected at the bottom of column 63, via line 65. Part of the oil collected via line 65 is conducted via line 66 in an oven 67 where it is heated to distillation temperature, before being mixed with the charge of line 62 and recycled to column 63. It is oven 67 which supplies calories inside the column 63.

The distillation conducted in column 63 therefore enables the gas oil to be separated from the oil. However, at the same time, the oil undergoes a thermal shock due to the high temperature of oven 67. The effect of this thermal shock is to break the molecules of additives contained in the charge and to allow separation of the heavy metals during the subsequent treatments of the oil obtained in line 65.

A second part of the oil of line 65 is conducted, via line 68, in a centrifuge 69, functioning at a temperature close to 180° C. Centrifugation allows separation of a sludge containing the heavy metals in particular and which is eliminated via line 70.

The oil leaving the centrifuge via line 71 is regenerated to be used as base for lubricating oil.

In a conventional process for regeneration of waste oils, the oil leaving the centrifuge via line 71 undergoes an acid treatment to flocculate the carbon particles and sulfonate the oxidised products.

In the process according to the invention, the acid treatment is replaced by an ultrafiltration, which avoids elimination of the acid sludge.

In the embodiment shown in FIG. 3, the oil leaving the centrifuge 69 is conducted via line 71 into an ultrafiltration unit 1. A heat exchanger may be placed between the centrifuge 69 and the unit 1 to cool or heat the oil to the temperature at which it is desired that ultrafiltration be effected. The non-filtered oil is recycled in the oven 67 via line 72.

The ultrafiltrate is then introduced via line 73 into the median part of a column 85 for distillation under reduced pressure. Fractions of oil of different viscosities may therefore be collected at different heights of this column via lines 86, which are then subjected to a treatment of catalytic hydrogenation to decolorize them. They are introduced into the buffer vats 87 then into the hydrogenation reactor 88. The hydrogen is conducted via line 89. The regenerated oil is collected at 90.

In the other embodiment shown in FIG. 4, the distillation carried out in column 63' is effected under reduced pressure. Different fractions are collected at different heights of the column via lines 64',65' and 75, which are treated differently. Gas oil is collected via line 64' at the top of the column. Oil is collected at the bottom of the column via line 65', of which part is conducted via line 66' into the oven 67' and recycled to column 63'.

The other part of the oil is conducted in the centrifuge 69'.

The oil fractions collected via lines 75 at different heights of the column and the one collected via line 71' at the outlet of the centrifuge 69', are collected in buffer vats 87, then sequentially ultrafiltered in the unit 1. The non-filtered oil is recycled via line 80 into the oven 67'.

The ultrafiltrate is hydrogenated in the reactor 88 in the same way as in the embodiment of FIG. 3.

The invention is illustrated in non-limiting manner by the following two examples which concern tests made in the installation shown in FIGS. 1 and 2.

EXAMPLE 1

This example concerns a test of ultrafiltration of a charge of waste oil. This test was carried out at a temperature of 200° C. with an ultrafiltration module comprising 7 barriers coated with a sensitive layer constituted by mixed oxide of aluminium and of magnesium mixed with silica, with a pore radius of 200 Å. The pressure was 5 relative bars, with a linear speed in the barriers of 3.23 m/s. Under these conditions, the rate of ultrafiltration obtained was 650 l/d/m$^2$.

The characteristics of the charge of the ultrafiltrate and of the concentrate are given in Table I below.

This example clearly shows the efficiency of the process according to the invention for regenerating the waste oils.

EXAMPLE 2

This example concerns a test of ultrafiltration of residues of distillation in vacuo of a crude oil originating from Kirkuk, Iraq. This test was carried out at a temperature of 330° C. on an ultrafiltration module comprising 3 barriers coated with a sensitive layer of titanium dioxide and aluminium oxide, with a radius of permeametry of 100 Å. The pressure of ultrafiltration was 5 relative bars and the linear speed 5.6 m/s. The rate of ultrafiltration was 667 l/d/m$^2$.

The characteristics of the charge of the ultrafiltrate and of the concentrate are given in Table II below.

This example shows that the rate of asphaltenes of a charge containing same may be reduced by using the process according to the invention.

TABLE I

| According to standard | Charge | Ultrafiltrate | Concentrate |
|---|---|---|---|
| Viscosity 40° C. | 100.2 | 87.2 | 127.92 |
| NFT 60-100 cSt 100° C. | 11.8 | 10.2 | 14,05 |
| VI | 107 | 97 | 108 |
| ASTM S 664 TAN inflection mgKOH/g |  | 0.1 |  |
| pH | 0.6 |  | 1 |
| ASTM D 664 TBN inflexion mgKOH/g |  | 0.1 |  |
| pH | 0.1 |  | 0.1 |
| ASTM 12896 TBN mg/KOH/g | 2.4 | 0.41 | 5.20 |
| ASTM D 893 pentane insolubles % m | 0.78 | <0.05 | 0.91 |
| toluene insolubles % m | 0.31 | <0.05 | 0.51 |
| NFT 60-116 Conradson % m | 2.1 | 0.47 | 2.9 |
| NFT 60-143 Sulfated ashes % m | 0.35 | <0.005 | 0.68 |
| NFT 60-110 Saponif. index mgKOH/g | 5.0 | 2.1 | 6.0 |
| ppm weight |  |  |  |
| Ba | 85 | <10 | 176 |
| Ca | 602 | <10 | 1241 |
| Mg | 96 | <10 | 199 |
| B | <10 | <10 | <10 |
| Zn | 15 | <10 | 31 |

TABLE I-continued

| According to standard | Charge | Ultrafiltrate | Concentrate |
|---|---|---|---|
| P | 520 | 29 | 1079 |
| Fe | 152 | 6 | 315 |
| Cr | 3 | <1 | 6 |
| Al | 6 | <2 | 13 |
| Cu | 2 | <1 | 4 |
| Sn | 3 | <2 | 5 |
| Pb | 241 | 8 | 502 |
| Ag | <1 | <1 | <1 |
| Si | 15 | 3 | 31 |
| Na | 41 | <5 | 85 |
| Mo | <2 | <2 | <2 |
| % weight | | | |
| S | 0.97 | 0.92 | 1.01 |
| N | ≦0.05 | ≦0.05 | ≦0.05 |

TABLE II

| | Ultrafiltrate | Concentrate | Charge |
|---|---|---|---|
| asphaltenes (% weight) | 4.14 | 9.36 | 6,30 |
| Vanadium (ppm weight) | 90 | 195 | 128 |
| density at 15° C. | 0.9831 | 1,0400 | 1,0156 |
| viscosity at 100° C. (cSt) | 188 | — | 650 |

What is claimed is:

1. A process for the treatment of a liquid hydrocarbon charge by ultrafiltration to remove unwanted impurities from said liquid hydrocarbon, said process consisting essentially of circulating said charge at a temperature greater than 100° C. in at least one module comprising at least one mineral ultrafiltration barrier coated with a sensitive layer of mixed oxide of magnesium and aluminum mixed with silica the direction of said circulation being such that said liquid hydrocarbon charge initially contacts an outer surface of said coating whereby said impurities are removed from said liquid hydrocarbon charge by said coated barrier to produce an ultra-filtrate essentially free of impurities, said barrier having a radius of permeametry between 50 Å and 250 Å and being adapted to support a counter pressure of between 1 and 30 relative bars.

2. The process of claim 1, wherein the mineral barrier is a barrier with a ceramic support.

3. The process of claim 1, wherein the mineral barrier is a barrier with a metal support.

4. The process of claim 1, wherein the pressure of ultrafiltration is between 1 and 20 relative bars.

5. The process of claim 1, applied to the regeneration of a waste oil, wherein the charge is constituted by waste oil, the ultrafiltrate obtained constituting an oil purified of its impurities.

6. The process of claim 5, wherein the waste oil is subjected to a heat treatment prior to its ultrafiltration, at a temperature of between 200° and 350° C.

7. The process of claim 1 wherein, without interrupting the circulation of said liquid hydrocarbon charge through said at least one barrier, a counter-pressure of ultra-filtrate is momentarily applied to a non-coated surface of said at least one barrier to provoke a reversal of the direction of said circulation.

8. The process of claim 1 wherein the speed of circulation of said liquid hydrocarbon charge is between 1 and 10 m/s.

9. The process of claim 1 wherein said treatment is carried out at a temperature of between 100° and 350° C.

10. The process of claim 1 wherein said liquid hydrocarbon charge contains asphaltenes and said ultra-filtrate contains a lesser concentration of asphaltenes than said charge.

11. The proces of claim 10, wherein the radius of the pores of the barrier is 100 Å.

12. The method of claim 1 wherein said liquid hydrocarbon charge is waste oil containing water and solid matter and said method includes the steps of:
heating the waste oil,
centrifuging it in order to separate the water and the solid matter,
heating it in an oven to a temperature of between 150 and 200° C.,
distilling it, under a pressure close to atmospheric pressure, in a first column,
collecting the waste oil at the bottom of said first distillation column,
introducing it in the median part of a second distillation column in which it is distilled under a pressure close to atmospheric pressure, at a temperature of 360° C.,
collecting the oil at the bottom of the second column,
recycling part of the oil collected at the bottom of the second column to an oven where it is heated to a temperature of distillation, before being mixed with the charge of the line from the first column and recycled in the second column,
centrifuging a second part of the oil at a temperature close to 180° C. in a centrifuge, and
wherein the oil leaving the centrifuge is filtered in said at least one ultrafiltration module.

13. The process of claim 1, wherein the ultrafiltrate obtained on leaving the module is distilled at a pressure lower than atmospheric pressure, and oils of different viscosities are collected via lines located at different heights on a third distillation column, which undergo a hydrogenation treatment.

14. The method of claim 1 wherein said liquid hydrocarbon charge is waste oil containing waste and solid matter and said method includes the steps of:
heating the waste oil,
centrifuging it in order to separate the water and the solid matters,
heating it in an oven to a temperature of between 150° and 200° C.,
distilling it under a pressure close to atmospheric pressure, in a first column,
collecting the waste oil at the bottom of said first distillation column,
introducing it into the median part of a second distillation column in which it is distilled under a pressure lower than atmospheric pressure, at a temperature of 360° C., collecting:
(a) a first oil fraction at the bottom of the second column,
  recycling part of the oil collected at the bottom of the second column in an oven where it is heated to the temperature of distillation, before being mixed with the charge of the line from the first column and recycled in the second column,
  centrifuging a second part of the oil at a temperature of 180° C. in a centrifuge,
(b) different oil fractions at different heights of the second column,
wherein the oil leaving the centrifuge from (a) and the different oil fractions of (b) are filtered in said ultrafiltration module and then undergo a hydrogenation treatment.

* * * * *